(12) United States Patent
Yang (10) Patent No.: US 8,860,877 B2
(45) Date of Patent: Oct. 14, 2014

(54) SHORT-RANGE LIGHT SOURCE DEVICE FOR IMAGE PICK-UP APPARATUS AND IMAGE PICK-UP APPARATUS PROVIDED WITH SAME

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 300 days.

(21) Appl. No.: 13/525,350

(22) Filed: Jun. 17, 2012

(65) Prior Publication Data

US 2013/0169860 A1     Jul. 4, 2013

(30) Foreign Application Priority Data

Jan. 2, 2012   (TW) ............................. 101100058 A (51) Int. Cl.
*H04N 5/222* (2006.01)

(52) U.S. Cl.
USPC ....................................................... 348/371

(58) Field of Classification Search
CPC . H04N 5/2354; H04N 5/2256; H04N 5/2252; H04N 5/2251
USPC ......... 348/370, 371, 372, 373, 374, 375, 376; 396/199, 200
See application file for complete search history.

(56) References Cited

U.S. PATENT DOCUMENTS

| | | | | |
|---|---|---|---|---|
| 5,805,940 A | * | 9/1998 | Lawther et al. | 396/178 |
| 5,828,910 A | * | 10/1998 | Lawther et al. | 396/178 |
| 7,327,526 B1 | | 2/2008 | Yang | |
| D593,244 S | * | 5/2009 | Cytrynowicz | D26/73 |
| 7,821,569 B2 | | 10/2010 | Yang | |
| 8,449,150 B2 | * | 5/2013 | Allen et al. | 362/311.06 |
| 2005/0174474 A1 | * | 8/2005 | Hasegawa | 348/370 |
| 2008/0284902 A1 | * | 11/2008 | Konno et al. | 348/370 |
| 2010/0195335 A1 | * | 8/2010 | Allen et al. | 362/309 |
| 2012/0133824 A1 | * | 5/2012 | Shaw et al. | 348/370 |

* cited by examiner

*Primary Examiner* — Nicholas Giles (57) ABSTRACT

The present invention discloses a short-range light source device for use with an image pick-up apparatus and the image pick-up apparatus provided with the same. The short-range light source device comprises a fixing base, multiple protective cap units, multiple light source units and multiple driving units. The fixing base constitutes a light receiving pathway corresponding to the lens of the image pick-up apparatus. Upon being driven by the driving units, the protective cap units are pivotally rotated in relation to the fixing base between a protective shielding position and an open position in a synchronous manner. Each of the light source units has a light exit face which is shielded and protected when the protective cap units are located at the shielding position and exposed when the protective cap units are located at the open position.

10 Claims, 8 Drawing Sheets

SHORT-RANGE LIGHT SOURCE DEVICE FOR IMAGE PICK-UP APPARATUS AND IMAGE PICK-UP APPARATUS PROVIDED WITH SAME

BACKGROUND OF THE INVENTION

1. Field of the Invention

The present invention relates to a light source device and an image pick-up apparatus provided with the same. In particular, the invention relates to a short-range light source device for use with an image pick-up apparatus and the image pick-up apparatus provided with the same.

2. Description of Related Art

The advancement in modern optical technologies obfuscates differentiations among various image pick-up devices, such as, for example, video recorders, cameras, camera phones and so forth, and progressively enables more and more consistent functions among them. As a result, the effective image capture range is gradually expanded, and objects in front of the lens within a close proximity of simply several centimeters can be clearly recorded even with a general camera phone. As the photographic distance becomes smaller, the image of the target object may occupy the entire screen. However, light beams diffused from the target object are not augmented. In other words, the picture inevitably gets dimmer when the photographic distance is gradually shortened, or even in the end becomes unable to be distinctly analyzed.

Short-range image capture is an important technology, especially with regards to many professional fields like dermatological treatment or criminal identification, including diagnoses of dermatoses, pre- and post-operation effects tracking on medical cosmetic surgeries, and verification of specific fluorescent reaction substances for example, in a body fluid, all of which require precisely recorded image data. However, compared with photographic demands in terms of common daily lives, voyages etc., the aforementioned requirements attract less people's attention, and, for commercial reasons, general camera manufacturers are not quite interested in making serious responses to this type of light supplement needs.

Figure 1:
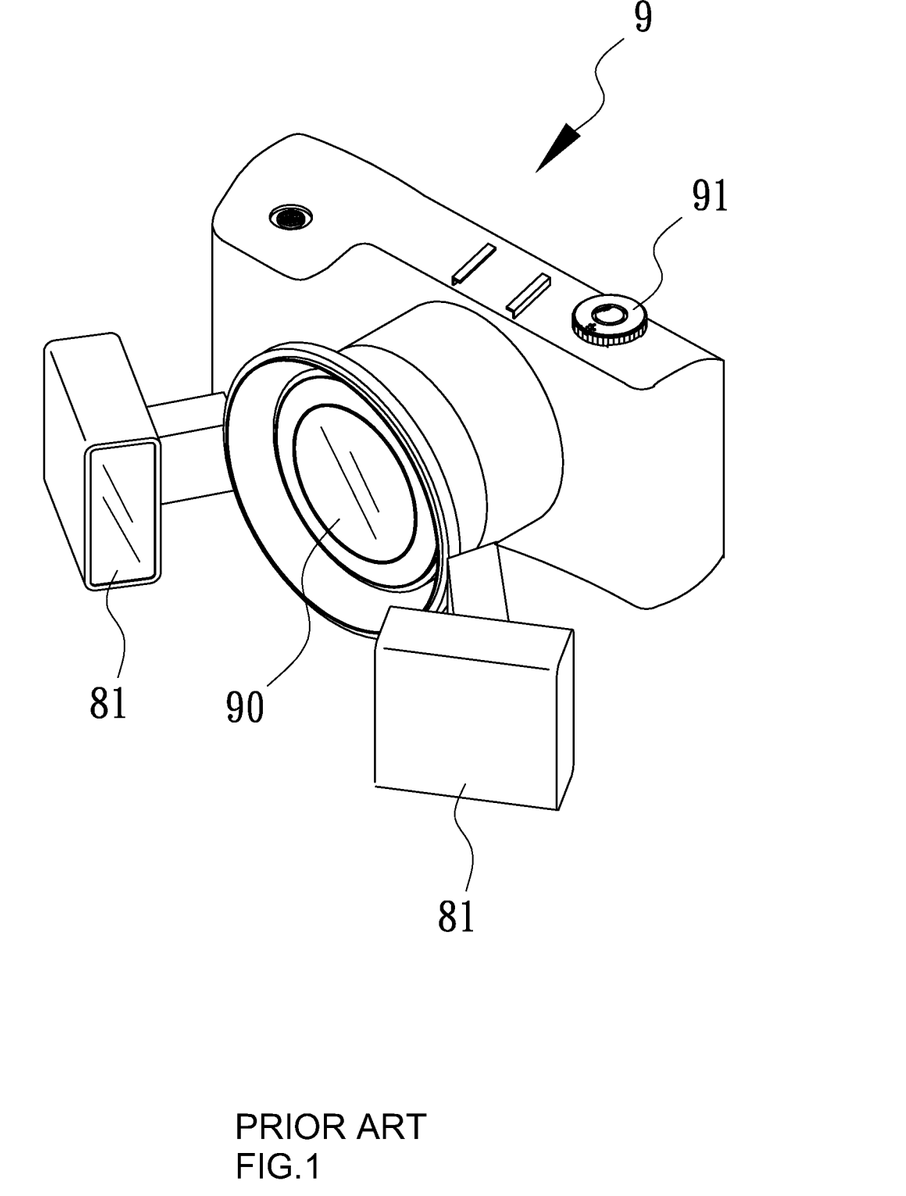
FIG. 1 shows a perspective view of a conventional short-range light supplement device installed on a camera.

A conventional light supplement device is shown in FIG. 1, wherein two flashlights 81 are directly mounted, one in left and one in right, on the front side of a close-range photographic lens 90 of a camera 9. In taking a picture, the shutter button 91 sends a signal to trigger the two flashlights 81, so as to generate synchronous flash illumination, thereby providing the camera with light supplement. Unfortunately, such a type of light supplement can only offer transient illumination and fails to provide continuous illumination. Consequently, it cannot be used in the technical fields that require illumination of relatively longer duration, such as criminal identification for fluorescent reaction generated by means of continuous illuminations on different areas to achieve protein spotting, and dermatological treatment in which continuous illumination is used to effectively locate niduses of skin cancer. Moreover, the conventional device, once discharged, needs a little while to be recharged to perform next lighting, thus restricting user's operation. In particular, transient light emissions of overly high intensity from a general flashlight, after short-range flashes thereof, may cause brief visual saturation and temporary blindness in user's eyes, which is unfavorable for user's operation as well. Besides, the angle of the flashlights may undesirably lead to significant shadows or light reflections hard to be eliminated.

Figure 2:
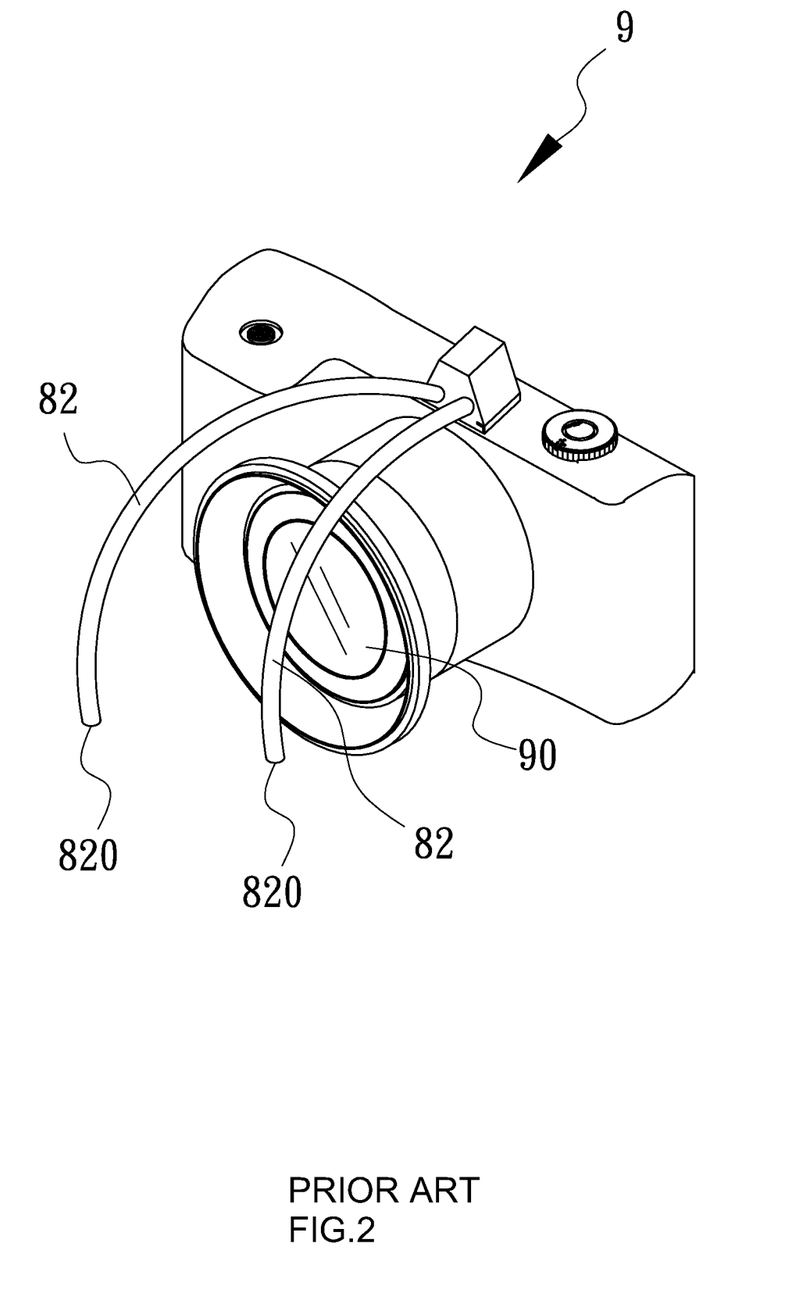
FIG. 2 shows a perspective view of another conventional short-range light supplement device installed on a camera.

Another conventional light supplement device is shown in FIG. 2, wherein a light emitting diode 820 is installed at the front end of a bellow tube 82, and a power line passes through the bellow tube 82 to acquire electric energy from the camera 9, thereby allowing a photographer to manually adjust the bellow tube 82 to an appropriate angle in order to provide light supplement for the desired photographic position. In this way, seeing that the adopted light source is the light emitting diode 820, it is possible to provide light supplement of longer duration in time, thereby somewhat improving the aforementioned problem of transient flash. However, the effect of light supplement may be lower than expected because the angle of the bellow tube 82 cannot be precisely adjusted. Further, the structure of the bellow tube 82 may become problematic in reception, unfavorable for outdoor portability. Especially, since the bellow tube 82 need to be bent towards the lens 90 during use, in the case where a target object located in front of the lens 90 at a distance as short as 3 centimeters, for example, the bellow tube 82 would be very difficult to be bent over within such a narrow 3-centimeter interval; even barely pulled in, the angle of provided light supplement would usually become vertical to the light axis direction of the lens 90. Accordingly, light cannot be effectively projected onto the front side of the target object and only lateral sides thereof can be illuminated.

Therefore, with regard to a short-range light source device used to provide light supplement in assisting image capture for short distance photography, issues concerning illumination of longer duration in time on the required image capture area, correct light supplement direction for casting light on the front side of the image capture area, along with precise light supplement adjustment for illumination angle or even anticipated shadow effect caused by light source of light supplement so as to successfully obtain information of high precision on the target object, indeed have to be addressed.

SUMMARY OF THE INVENTION

An objective of the invention is to provide a short-range light source device for an image pick-up apparatus, which allows substantial light supplement at a short distance.

Another objective of the invention is to provide a short-range light source device for an image pick-up apparatus, which allows precise adjustment of the light supplement position.

Yet another objective of the invention is to provide a short-range light source device for an image pick-up apparatus, which provides continuous illumination to the light supplement position.

Still another objective of the invention is to provide an image pick-up apparatus provided with a short-range light source device, which allows substantial and distinct image capture at a short distance.

Still another objective of the invention is to provide an image pick-up apparatus provided with a short-range light source device, which allows incessant short-range image monitoring and obtains appropriate image data.

Yet still another objective of the invention is to provide an image pick-up apparatus provided with a short-range light source device, which allows selective adjustment on light supplement angle so as to acquire image data of specific light field within a short distance.

Therefore, the invention discloses a short-range light source device for use with an image pick-up apparatus. The image pick-up apparatus includes at least one lens and the short-range light source device is mounted in the image pick-up apparatus in a manner corresponding to the at least one lens. The short-range light source device comprises:

a fixing base, constituting a light receiving pathway corresponding to the at least one lens;

a plurality of protective cap units, adapted to pivotally rotate in relation to the fixing base between a protective shielding position and an open position in a synchronous manner;

a plurality of light source units, each having a light exit face which is shielded and protected when the protective cap units are located at the shielding position and exposed in the case where the protective cap units are located at the open position; and a plurality of driving units for driving the protective cap units to pivotally rotate, wherein each of the driving units includes a pivot allowing pivotal rotation of one of the protective cap units in relation to the fixing base, and bevel gears mounted at both ends of the pivot and meshed with the adjacent driving units.

After installation of the aforementioned short-range light source device onto an image pick-up apparatus capable of short-range focusing, an image pick-up apparatus having the short-range light source device according to the invention is acquired. The image pick-up apparatus comprises a device body, a lens mounted on the device body, and a short-range light source device mounted in a manner corresponding to the lens. The short-range light source device comprises:

a fixing base, constituting a light receiving pathway corresponding to the at least one lens;

a plurality of protective cap units, adapted to pivotally rotate in relation to the fixing base between a protective shielding position and an open position in a synchronous manner;

a plurality of light source units, each having a light exit face which is shielded and protected when the protective cap units are located at the shielding position and exposed in the case where the protective cap units are located at the open position; and a plurality of driving units for driving the protective cap units to pivotally rotate, wherein each of the driving units includes a pivot allowing pivotal rotation of one of the protective cap units in relation to the fixing base, and bevel gears mounted at both ends of the pivot and meshed with the adjacent driving units.

In the light source device according to the invention, since the respective protective cap units are driven to pivotally rotate by means of the driving units corresponding thereto and since each of the driving units includes bevel gears mutually meshed with adjacent driving units, the respective protective cap units are pivotally rotated in a synchronized manner. Through the synchronized pivotal rotation of the protective cap units, in the case where short-range light supplement is needed, it is possible to allow the light source units to be exposed or even further precisely modify the illumination angle of the light source units by precisely adjusting the angle of the pivotal rotation. As such, the desired light supplement position can be suitably and continuously illuminated, thereby enabling acquisition of clear and continuous short-range images by the image pick-up apparatus. Particularly, when there is a specific demand, the invention allows alteration of the color and light field distribution of the light supplement through selective activation of the light source units, so as to generate different special effects or acquire information on the shadow at a specific angle.

DETAILED DESCRIPTION OF THE PREFERRED EMBODIMENTS

The aforementioned and other technical contents, aspects and effects in relation with the invention can be clearly appreciated through the detailed descriptions concerning the preferred embodiments of the invention in conjunction with the appended drawings. Since the short-range light source device disclosed herein can be used with a camera, a video recorder or a camera phone in a manner known in the art, such image pick-up apparatuses will not be detailed in the following figures and embodiments for the sake of clarity and brevity.

Figure 3:
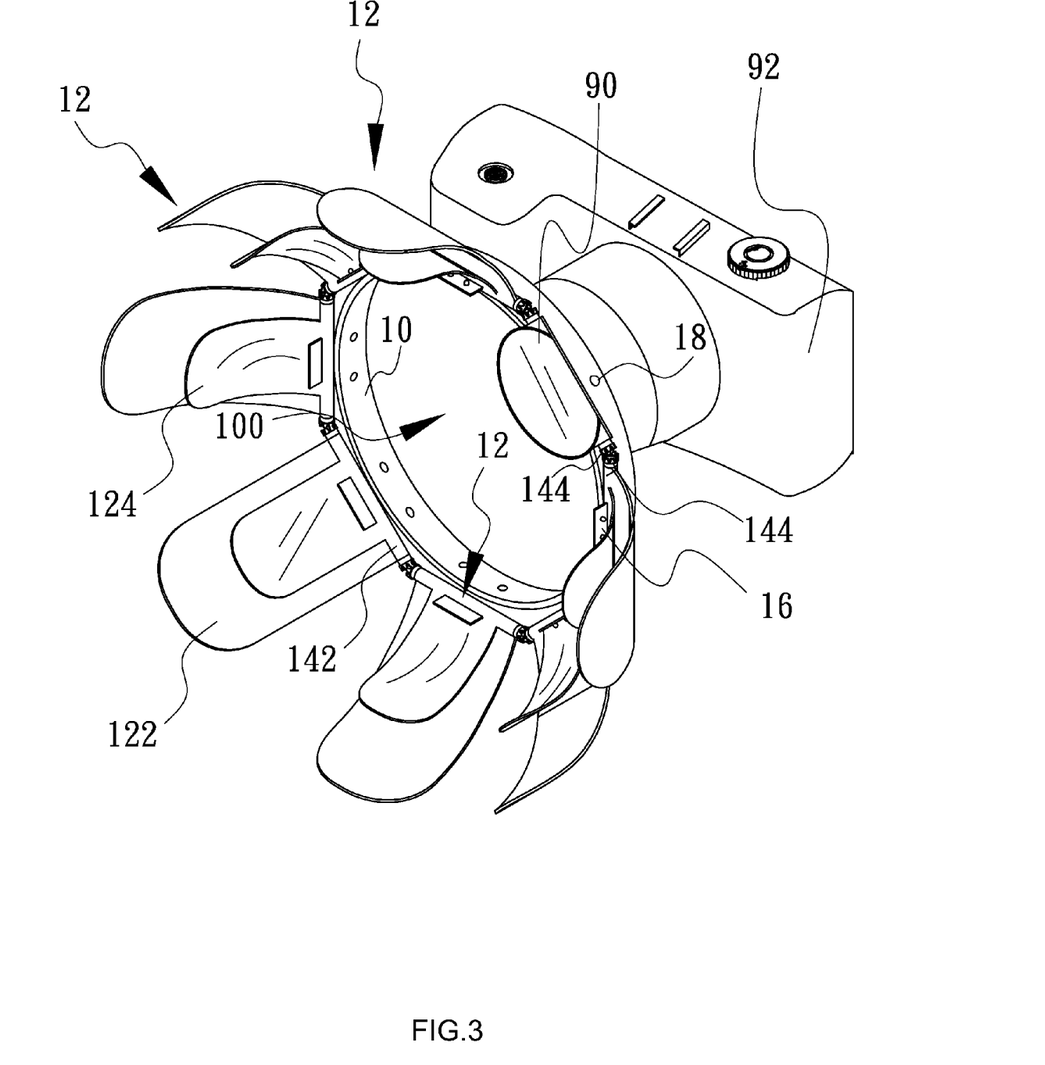
FIG. 3 shows a perspective view for a short-range light supplement device according to a first preferred embodiment of the invention.

A first preferred embodiment of the invention is shown in FIG. 3, wherein a short-range light source device according to the invention is installed on a front side of the lens 90 of an image pick-up apparatus 92 exemplified as a device body of a camera. The short-range light source device comprises a fixing base exemplified as a fixing ring 10 for coupling to the front side of the lens 90. The fixing ring 10 is formed at its central portion with a light receiving pathway 100 corresponding to the light axis of the lens 90. In this embodiment, the fixing ring 10 is provided at its front side with, for example, eight protective cap units 12. Each of the protective cap units 12 is connected to the fixing ring 10 via a pivot 142, such that the protective cap units 12 can be pivotally rotated relative to the fixing ring 10. Each of the protective cap units 12 includes a cap body part 122 as an outer layer and an independent reflective mirror 124 disposed at an inner side of the cap body part to serve as a reflective part.

Figure 4:
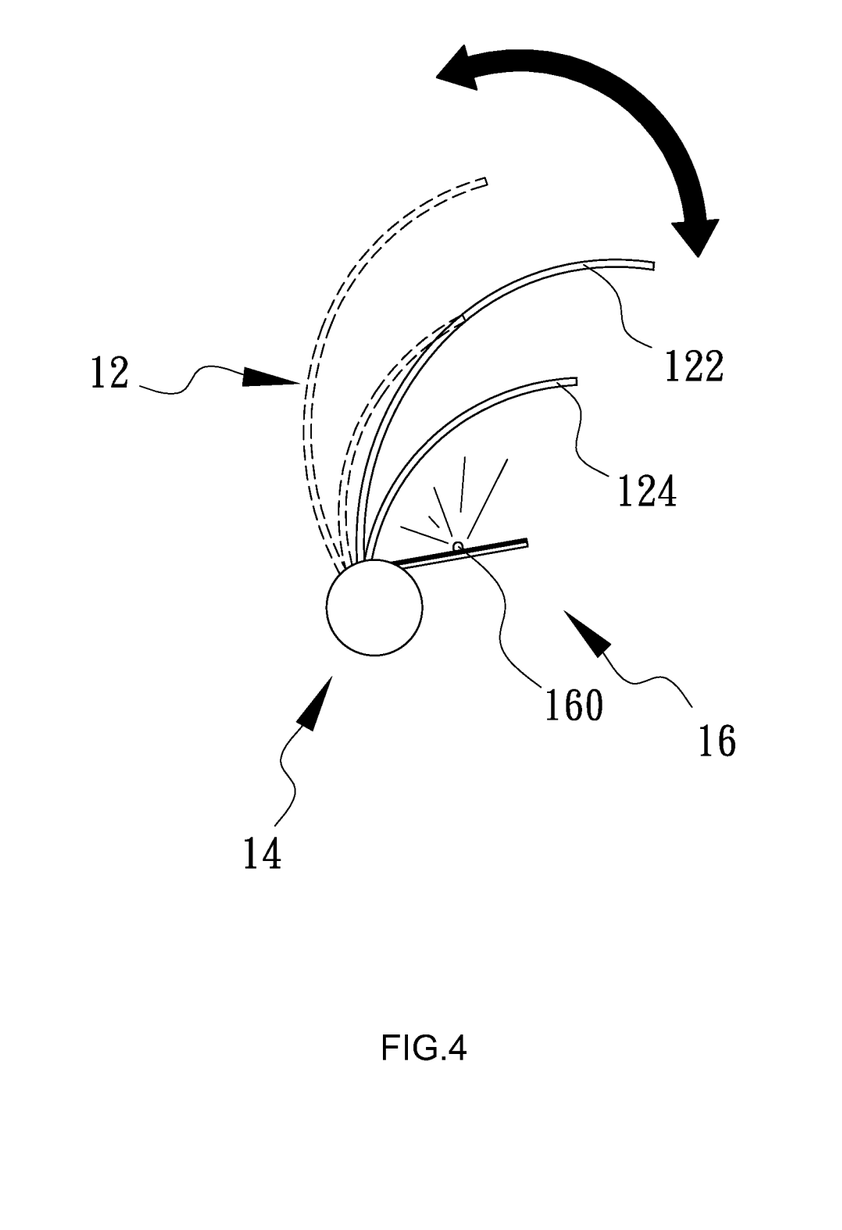
FIG. 4 shows a side view for the embodiment in FIG. 3, illustrating the pivotal rotation of the protective cap unit driven by the driving device.
Figure 5:
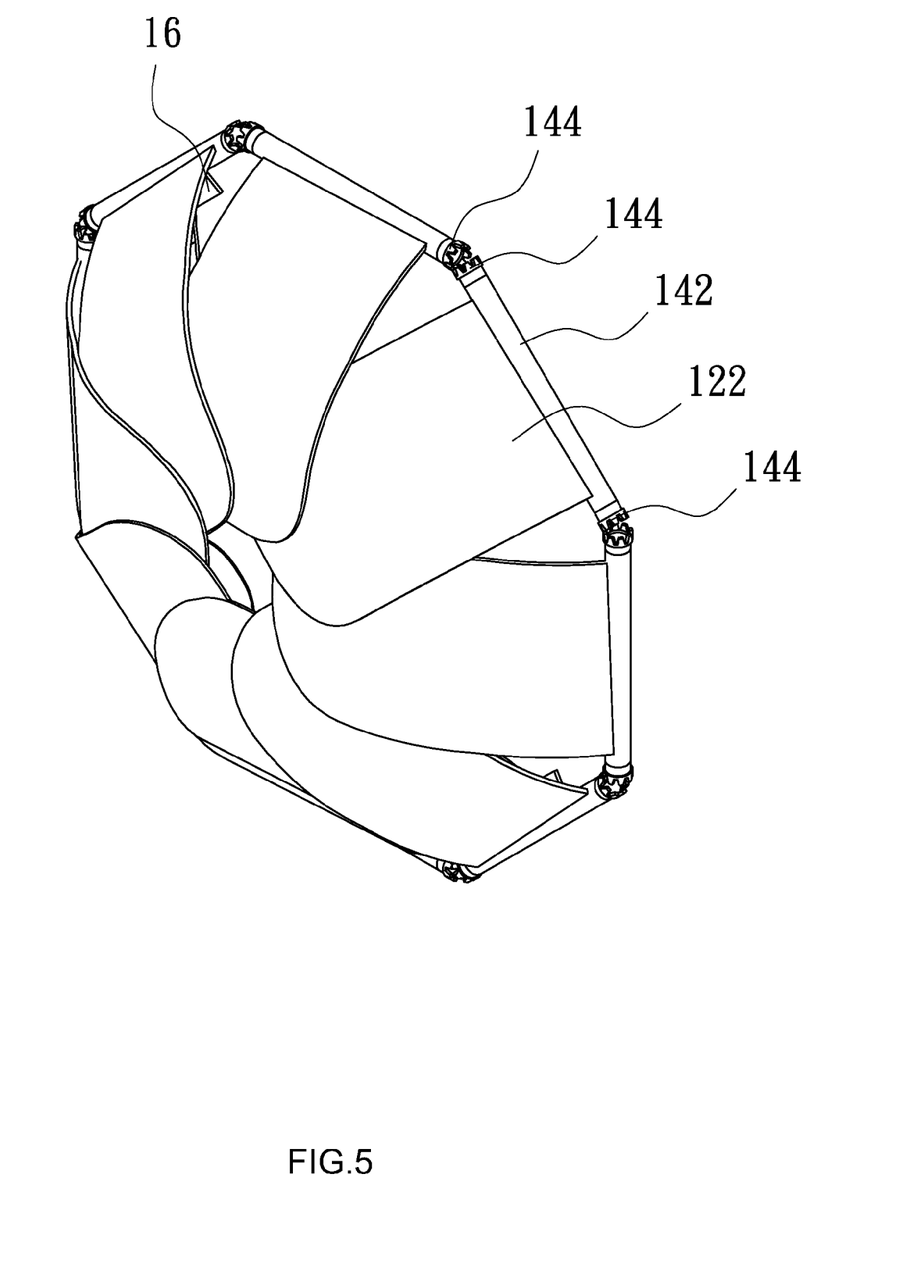
FIG. 5 shows a perspective view of the protective cap unit positioned at the protective shielding position for the embodiment in FIG. 3.

To ensure that the respective protective cap units 12 are rotated at the same angle relative to the fixing ring 10, the respective pivots 142 are provided at their left and right sides with bezel gears 144, with each bezel gear 144 being mutually meshed with the adjacent one such that the rotation of all pivots 142 can be synchronized. For clarity, any of the pivots 142, together with the bezel gears 144 provided at both sides thereof, are generally referred to as a driving unit 14. Next, conjunctively referring to FIGS. 4 and 5, each protective cap unit 12, upon being driven by the driving unit 14, is gradually opened with the pivotal rotation from a protective shielding position, where the protective cap units 12 are mutually shielded, to an open position as shown by the dash line in FIG. 4, and vice versa for restoration in reverse rotation.

In this embodiment, each of the protective cap units 12 is provided beneath with a light source unit 16 which may by way of example be a light-emitting diode (LED). To fulfill the dual requirements for taking a picture of normal color and for capturing a picture adapted to, for example, body fluid identification, eight LEDs 160 are disposed in an arrangement of alternate white-light LEDs and ultra-violet (UV) LEDs, with the light exit face of each LED 160 being slightly inclined towards the corresponding reflective mirror 124 and pivotally rotated along with each protective cap unit 12 in a synchronous fashion. When the protective cap units 12 are located at the shielding position, the respective LEDs 160 are covered and protected by the respective cap body parts 122. On the contrary, in the case where the protective cap units 12 are located at the open position, the respective light exit faces of the LEDs 160 are exposed, and the light beams emitted therefrom are focused on a desired light supplement area by means of the corresponding reflective mirrors 124.

To perform focal distance adjustment, besides modifying the focal distance of the camera lens, it needs only to gently move anyone of the cap body parts 122, e.g. with a finger, to adjust the corresponding driving unit 14, whereby the rest seven driving units 14, as well as the protective cap units 12 and light source units 16, are immediately adjusted to the desired angle. As a result, light beams emitted from the respective LEDs 160 are concentrated to a new light supplement position by the respective reflective mirrors 124. In a more preferred embodiment, eight press-down switches 18 are installed along the periphery of the fixing ring 10 and adapted for controlling the respective LEDs, such that the user not only can make all of the four whit-light LEDs and the four UV LEDs illuminated, but can selectively render, for example, a single white-light LED illuminated to create a shadow in a particular direction when taking pictures, thereby distinctively identifying the three-dimensional altitude of a target object to further increase flexibility in image capturing.

Figure 6:
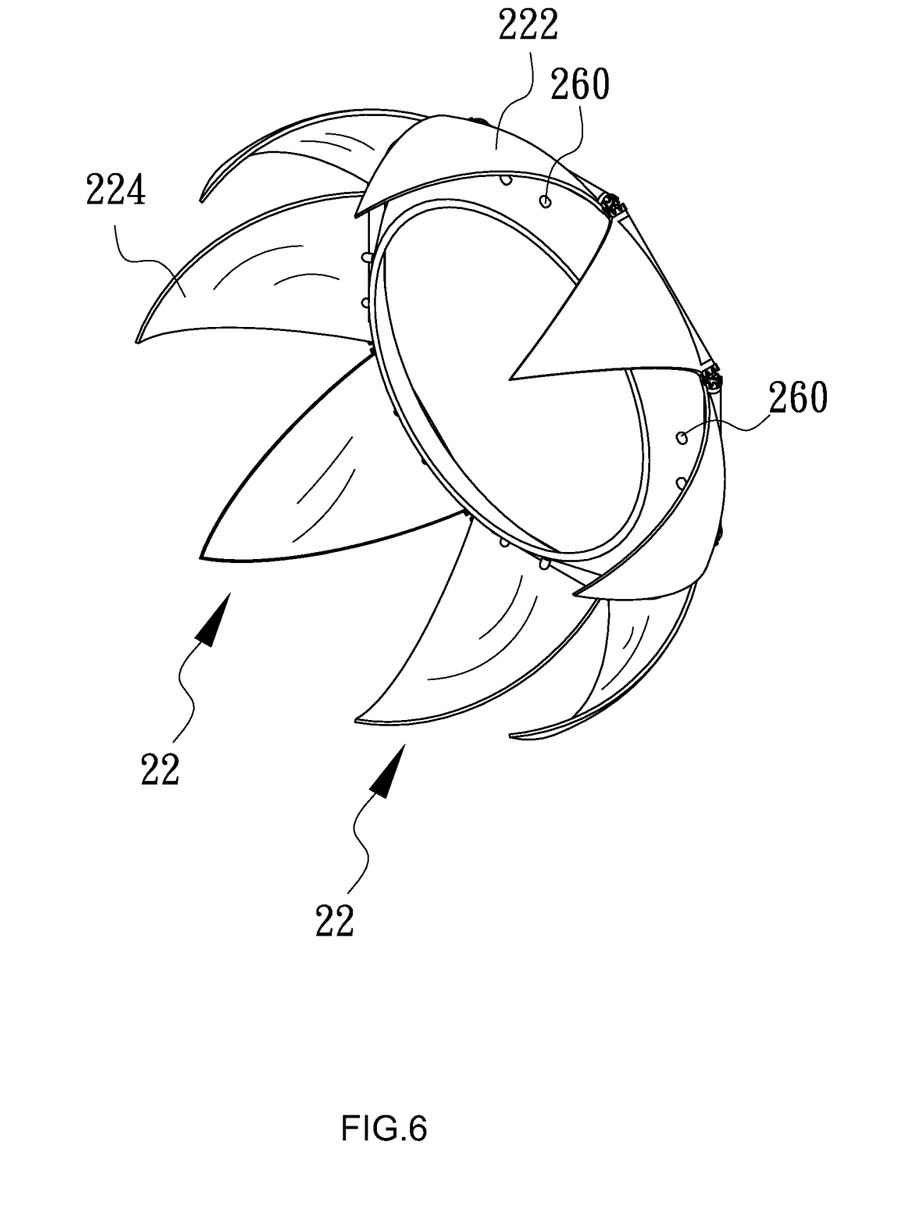
FIG. 6 shows a perspective view for a short-range light supplement device according to a second preferred embodiment of the invention.
Figure 7:
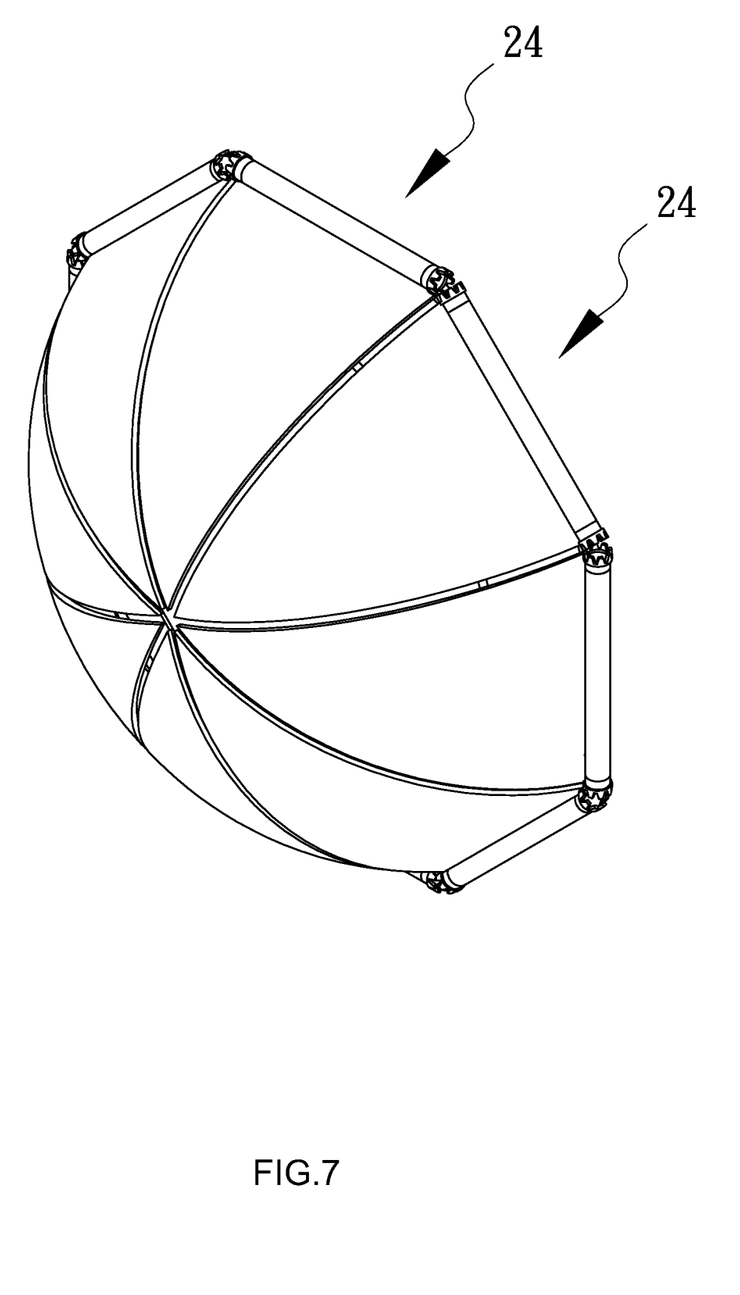
FIG. 7 shows a perspective view of the protective cap unit positioned at the protective shielding position for the embodiment in FIG. 6.

It is apparent to those skilled in the art that the light source units and protective cap units can be configured into different forms and arranged in various manners. According to the second preferred embodiment of the invention shown in FIGS. 6 and 7, the light source units are exemplified as laser diodes 260 mounted on the fixing base. In order to diverge the extremely narrow directional light beams emitted from the laser diode 260 for expanding the light supplement area, the reflective parts according to this embodiment are exemplified as reflective layers 224 coated on the inner sides of the cap body parts 222 for light diffusion. As the light diffusing reflective layers 224 are not entirely of mirror surface but slightly hazed, light beams emitted from the laser diodes 260 are diverged but similarly concentrated on the short-range light supplement target area. Based on the same technical features described above, the protective cap units 22 disclosed herein can also be adjusted by the driving units 24 that are mutually meshed for adjustment of the reflection angles of the protective cap units 22 in a synchronized manner, except that the respective driving units 24 can be driven by an electric motor (not shown) rather than manually manipulated.

Figure 8:
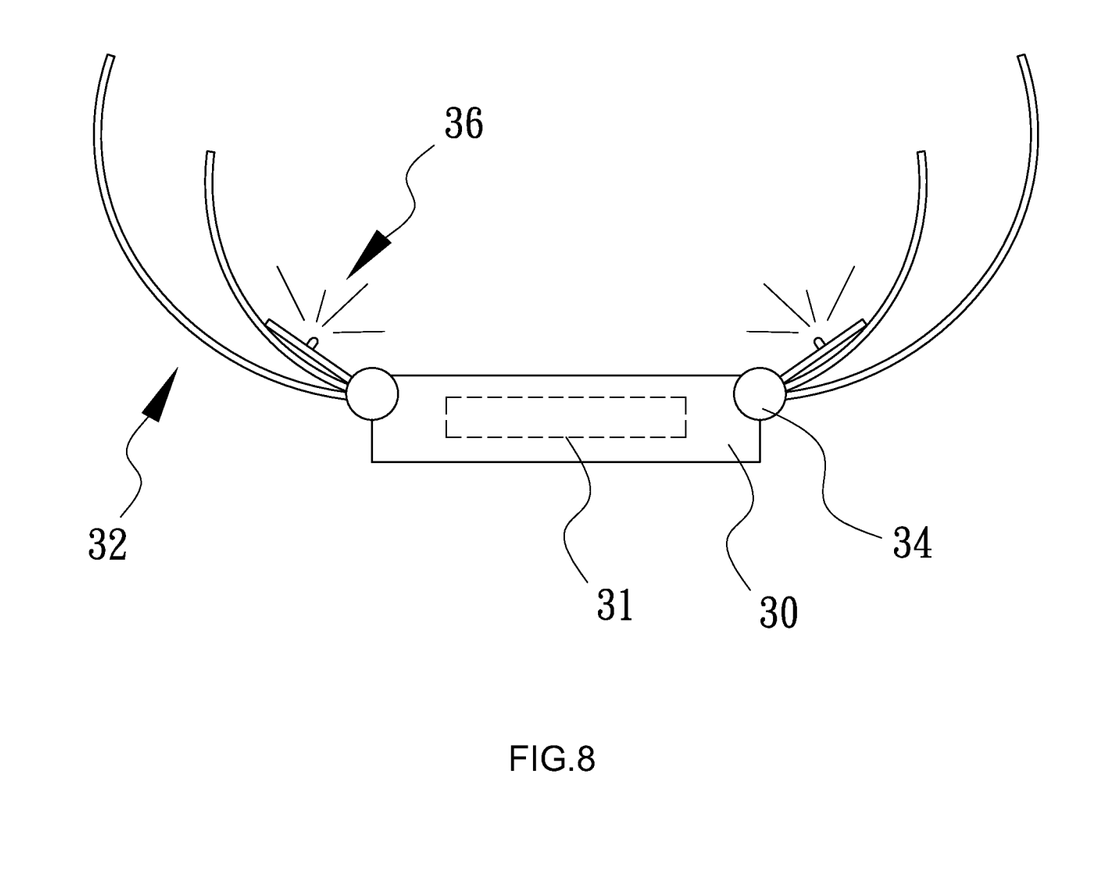
FIG. 8 shows a side view of a third preferred embodiment of the invention.

Furthermore, according to the third preferred embodiment of the invention shown in FIG. 8, the light source units 36 can be otherwise installed on the inner sides of the protective cap units 32 for direct illumination on the desired light supplement area. In this case, the protective cap units 32 need not be provided with reflective parts. The electric energy required by the light source units can be transmitted through the pivots in the driving units 34, and a power source unit 31, which may by way of example be a button-like alkaline battery, can be further installed within the fixing base 30. By way of the structural arrangement disclosed herein, the objective of precise adjustment of light supplement angle and distance can be readily achieved. In particular, long duration illumination is allowed such that brighter and more distinct image data can be obtained in taking short-range optical images, continuous observation and subsequent image capture determination become applicable, and light field can be arbitrarily altered so as to accomplish more desirable short-range image acquisition. The invention successfully achieves the objectives described above accordingly.

It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A short-range light source device for use with an image pick-up apparatus, wherein the image pick-up apparatus includes at least one lens and the short-range light source device is mounted in the image pick-up apparatus in a manner corresponding to the at least one lens, comprising:
   a fixing base, constituting a light receiving pathway corresponding to the at least one lens;
   a plurality of protective cap units, adapted to pivotally rotate in relation to the fixing base between a protective shielding position and an open position in a synchronous manner;
   a plurality of light source units, each having a light exit face which is shielded and protected when the protective cap units are located at the shielding position and exposed in the case where the protective cap units are located at the open position; and
   a plurality of driving units for driving the protective cap units to pivotally rotate, wherein each of the driving units includes a pivot allowing pivotal rotation of one of the protective cap units in relation to the fixing base, and bevel gears mounted at both ends of the pivot and meshed with the adjacent driving units.

2. The short-range light source device according to claim 1, wherein the respective light source units are mounted on the fixing base.

3. The short-range light source device according to claim 1, wherein the light source units are mounted on the protective cap units.

4. The short-range light source device according to claim 1, wherein the light source units comprise light emitting diode (LED) members.

5. The short-range light source device according to claim 1, wherein the protective cap units each includes a cap body part and a reflective part disposed at an inner side of the cap body part.

6. The short-range light source device according to claim 5, wherein the reflective part comprises a reflective mirror.

7. The short-range light source device according to claim 5, wherein the reflective part is a reflective layer coated on the cap body part.

8. The short-range light source device according to claim 1, further comprising a power source unit mounted in the fixing base, and switches for controlling the respective light source units.

9. An image pick-up apparatus provided with a short-range light source device, comprising:
   a device body;
   a lens mounted on the device body;
   a short-range light source device mounted in a manner corresponding to the lens, including:

a fixing base, constituting a light receiving pathway corresponding to the lens;

a plurality of protective cap units, adapted to pivotally rotate in relation to the fixing base between a protective shielding position and an open position in a synchronous manner;

a plurality of light source units, each having a light exit face which is shielded and protected when the protective cap units are located at the shielding position and exposed in the case where the protective cap units are located at the open position; and a plurality of driving units for driving the protective cap units to pivotally rotate, wherein each of the driving units includes a pivot allowing pivotal rotation of one of the protective cap units in relation to the fixing base, and bevel gears mounted at both ends of the pivot and meshed with the adjacent driving units.

10. The image pick-up apparatus according to claim 9, wherein the light source units comprises at least two light-emitting diode (LED) members having different central wavelengths in emitted light beams.

\* \* \* \* \*